United States Patent [19]

Metabi

[11] 4,115,505
[45] Sep. 19, 1978

[54] PROCESS AND APPARATUS FOR THE MANUFACTURE OF THREAD ENGAGEABLE MEMBERS

[75] Inventor: Tsuneyo Metabi, Sakai, Japan

[73] Assignee: Minolta Camera Kabushiki Kaisha, Osaka, Japan

[21] Appl. No.: 772,373

[22] Filed: Feb. 25, 1977

[30] Foreign Application Priority Data

Mar. 12, 1976 [JP] Japan ................................ 51-27515

[51] Int. Cl.² ........................ B29C 5/00; B29D 23/02; B29F 1/00
[52] U.S. Cl. .................................... 264/242; 249/59; 249/89; 249/95; 425/127; 425/129 R; 425/438; 425/808; 264/275; 264/318
[58] Field of Search ............. 350/69; 425/127, 129 R, 425/438, 808; 264/242, 249, 275, 318, 259, DIG. 41; 249/59, 95, 89

[56] References Cited

U.S. PATENT DOCUMENTS

| 536,343 | 3/1895 | Harrington | 249/59 |
| 1,476,717 | 12/1923 | Kandler et al. | 350/69 |
| 2,347,737 | 5/1944 | Fuller | 264/242 |
| 2,928,764 | 3/1960 | Magoon | 264/318 |
| 2,945,266 | 7/1960 | Mainardi | 264/DIG. 41 |
| 3,361,174 | 1/1968 | Bedford | 264/328 |
| 3,776,676 | 12/1973 | Kessler | 249/59 |
| 3,971,841 | 7/1976 | Rubinstein | 264/275 |

Primary Examiner—Willard E. Hoag
Attorney, Agent, or Firm—Wolder, Gross & Yavner

[57] ABSTRACT

A die cavity is delineated by the surfaces of a pair of die members and the threaded surface of a first of a pair of thread engageable members, one of the die members thread engaging a part of the threaded surface. A synthetic polymeric resin is injection molded in the cavity to produce a second member in precise thread engagement with the first member and the cavity is then opened to release the thread engaged members.

10 Claims, 3 Drawing Figures

PROCESS AND APPARATUS FOR THE MANUFACTURE OF THREAD ENGAGEABLE MEMBERS

BACKGROUND OF THE INVENTION

The present invention relates generally to improvements in the production molded assemblies and it relates particularly to an improved method and apparatus for the production of mutually thread engageable members or assemblies.

Hitherto, it has been a common practice in the manufacture of two thread engageable members to mold or manufacture the members separately. However, such a pair of thread engageable members are generally mismatched and possess non-compensating errors by reason of their independent fabrication, since it is generally impossible to manufacture such threaded members in true conformity with design dimensions. This then leads to a loose coupling and hence a lack of smooth operation between the two thread engaged members, because of the accumulation of errors which have been independently incurred.

In addition, where these two thread coupled members are manufactured separately, such as for instance, in the case of a focusing ring and a lens holding frame in the lens barrel of a camera which are to be used in mutual engagement with each other, there arises the need to assemble the two members for adjustment for correct engagement, after the manufacture of both members. This dictates an expenditure of much time and effort throughout a period from the manufacture to the assembly. Moreover, the finer the threads, the more difficult it is to complete the proper alignment of an axis of one thread with that of the other. A high degree of skill is required for the adjustment of the threads, resulting in an increased number of unacceptable and rejected parts if such operation is performed by operators with little experience.

Furthermore, in accordance with the aforesaid process of manufacturing the both members separately, quality control must be conducted for the male-threaded parts and the female-threaded parts in cooperation with each other, and hence the complexity in manufacture and assembly is increased with an increase in the number and type of parts, with an accompanying increase in the man hours consumed in control operations as well as an increase in manufacturing cost.

SUMMARY OF THE INVENTION

It is a principal object of the present invention to provide an improved method and apparatus which avoids the shortcomings in the prior art processes for manufacturing thread engageable members or components.

It is another object of the present invention to provide a process for manufacturing thread engageable members, in which either one of a male-threaded member or a female-threaded member is manufactured by using a material which is least susceptible to thermal deformation, such as a metal or a thermosetting resin, after which the other member is molded in or around the former member thus formed, by directly using the latter as a die for the former.

It is still another object of the present invention to provide a process of the above nature in which any machining error present in one member is compensated for by the other counterpart member, thereby obviating looseness therebetween.

It is a further object of the present invention to provide a process of the above nature, in which one member is manufactured or molded in an engaged condition with the other, thereby dispensing with any adjusting operation for correcting the threaded engagement after the manufacture, and saving the time and effort required for individual quality controls for the both members, and the manufacturing cost.

It is yet another object of the present invention to provide dies for use in the process described above.

BRIEF DESCRIPTION OF THE DRAWINGS

FIG. 2 and FIG. 3 are longitudinal medial cross-sectional view illustrative of a preferred embodiment of the present invention, in which FIG. 2 shows the closed condition of the die cavity forming members prior to injection of thermoplastic resin, and FIG. 3 shows the condition after the injection and solidification of the resin and the opening of the die members.

DESCRIPTION OF THE PREFERRED EMBODIMENTS

The improved process and apparatus according to the present invention will now be described in more detail with reference to the accompanying drawings which illustrate a preferred embodiment of the present invention.

Figure 1:
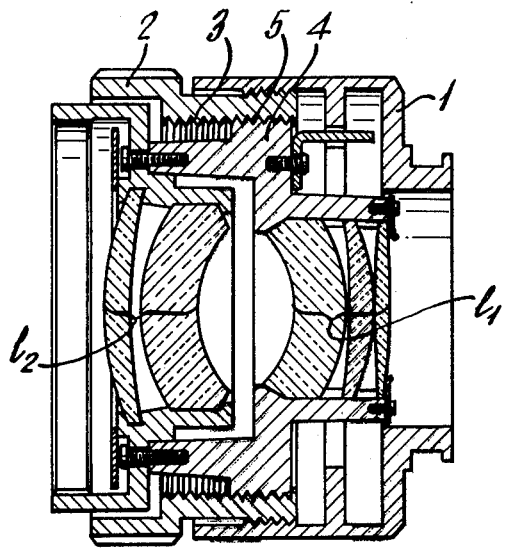
FIG. 1 is a longitudinal medial cross-sectional view of an objective lens employing a lens holding frame which has been manufactured according to the process of the present invention.

In FIG. 1 there is shown a camera objective lens barrel structure as an example of a device which employs a thread engaged member made by the process of the present invention. FIG. 1 shows the condition of a lens holding frame in actual use, for a better understanding of the principle incorporated in the present invention. Specifically, a fixed cylinder 1 is removably attached to a camera body, a focusing ring 2 is rotatably fitted in the fixed cylinder 1 for adjusting the focal length. Focusing ring 2 includes a helicoid or screw portion 3 in the form of a plurality of lines of threads in the inner peripheral surface of ring 2. A lens holding frame 4 retains a rear lens system $l_1$ and is coupled to a front lens system $l_2$. Lens holding frame 4 shifts the lens system $l_1$ and $l_2$ along the optical axis for varying the focal lenght and is engaged with the focusing ring 2 by way of a thread or helicoid 5 provided in the outer peripheral surface thereof and matingly engaging helicoid portion 3.

Figure 2:
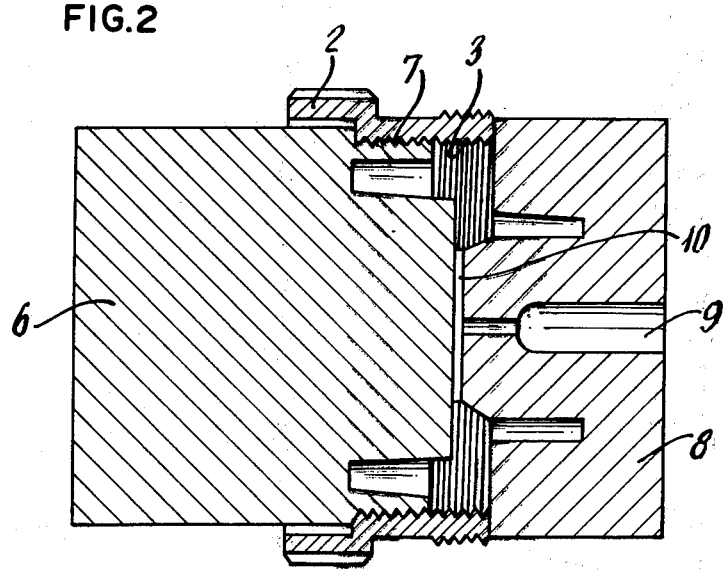

The process according to the present invention will be described hereinafter by referring to focusing ring 2 and lens holding frame 4 as an example of the threaded engageable members. As seen in FIG. 2, the focusing ring 2 is made of a material such as a metal or a thermosetting resin in accordance with conventional processes and is provided with a threaded or helicoid portion 3 in its inner peripheral surface, as has been earlier described. A first die 6 is in engagement with an opening of focusing ring 2. The first die is provided with an externally threaded holding portion 7 releaseably engaging helicoid portion 3 and adapted to hold focusing ring 2 in position. In this respect, holding portion 7 may be modified as desired, according to the shape of one of engageable members, into one which does not use a thread but holds the member from outside or uses a spring for holding the member from the inside by applying a force in the radial direction. A second die 8 is in engagement with the other opening of the focusing ring 2 and engages the first die 6 within and between the ends of the focusing ring 2. A tubular sprue 9 of conventional configuration extends through the second die 8. A runner 10 is provided along the boundary surface between the second die 8 and the first die 6, and communicates with the sprue 9. First and second dies 6 and 8 are provided with surfaces complementary to the front and rear surfaces of the lens holding frame 4 which is to be molded, thereby delineating and providing with the focusing ring helicoid portion 3 a cavity of a configuration conforming to that of the lens holding frame 4 to be molded.

Figure 3:
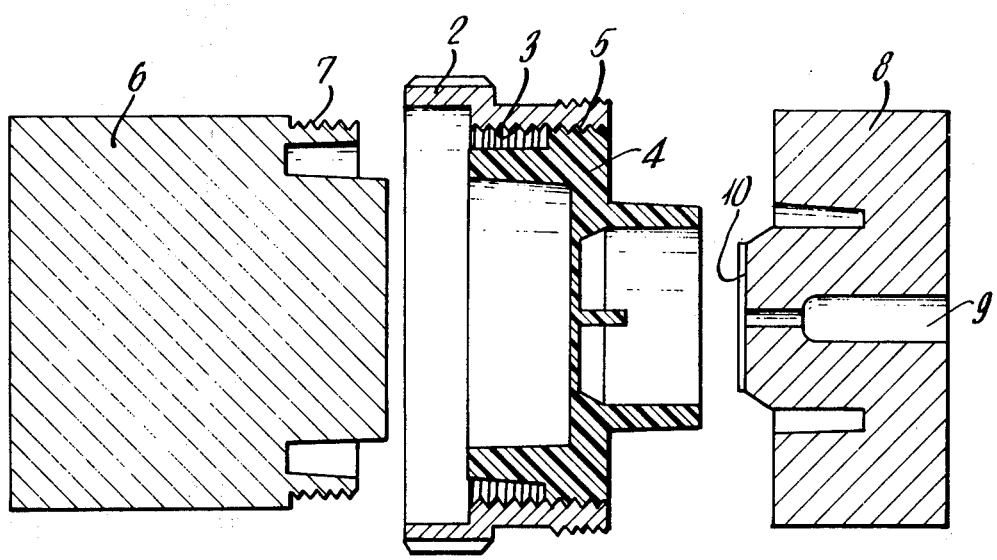

In the manufacture of the lens holding frame 4, focusing ring 2 is secured to the holding portion 7 of the first die 6 by interengaging the threaded portions thereof, and then second die 8 is brought into abutment with the edge or end face of the other opening of focusing ring 2, as shown in FIG. 2. A molten thermoplastic resin is then injected in the known manner with conventional equipment through sprue 9 and is delivered through runner 10 connected to sprue 9 into the cavity to fully fill the cavity. When the cavity is fully filled with the resin, then injection is interrupted and the cooling and solidifying of the cast or molded molten thermoplastic resin is then effected. Upon the completion of solidification, the second die 8 and the first die 6 are separated from the focusing ring 2 as is best shown in FIG. 3. In this condition, excess thermoplastic resin remains in sprue 9 and runner 10. However, these resin portions remaining in the sprue and runner assume the form of a spoke, and thus may be removed later, leaving a completed assembled lens holding frame as shown in FIG. 1.

As is apparent from the foregoing, a counterpart of two engageable members may be molded in or around the other which is made of a metal or thermosetting resin and has been molded beforehand, so that any manufacturing inaccuracy incurred in the manufacture of one member may be completely compensated for by the counterpart member, thus avoiding mismatching or loose engagement of the two members and hence insuring a smooth operation.

In addition, one of the engageable member is manufactured in an engaged condition to the other, so that, for instance, a focusing ring and a lens holding frame need not be assembled and adjusted for correct threaded engagement. Still further, the both members are molded in integral fashion, so that efforts for sorting and controlling these members are avoided, thus providing for a low manufacturing cost.

Although the present process has been described employing a thermoplastic resin material, it should be noted that the process according to the present invention should by no means be so limited, but is applicable to any kinds of plastics, such as glass fiber reinforced plastics and other reinforced thermoplastics. The inclusion of fibers as a filler material, additionally minimizes molding shrinkage. Thus, by suitably selecting the orientation of fibers, a clearance between the two engageable members may be suitably adjusted so as to provide a desired frictional resistance between the two.

While there have been described and illustrated preferred embodiments of the present invention, it is apparent that numerous alterations, additions and omissions may be made without departing from the spirit thereof.

I claim:

1. The method for making an assembled pair of first and second tubular members having mutually engaging threaded portions, comprising: positioning a set of die members with said first tubular member releaseably fastened to a first of said die members at a predetermined position thereon by engaging threads of said first tubular member with threads of said first die member until said first tubular member abuts a shoulder of said first die member, inserting a second of said die members into said first tubular member, abutting said first die member, said die members and said first tubular members defining a mold cavity therebetween, at least a threaded portion of said first tubular member defining a surface of said cavity, and said cavity being coaxial with said first member threaded portion injecting a molten thermoplastic material into said cavity cooling and solidifying said thermoplastic material in said cavity to produce said second tubular member in threaded engagement with said first tubular member, separating said die members and removing said first and second tubular members.

2. A process as defined in claim 1 wherein said thermoplastic material is a synthetic resin.

3. A process as defined in claim 1, wherein said thermoplastic material is a glass-reinforced plastic.

4. A process as defined in claim 1, wherein said holding means includes a threaded portion provided integrally with said first die, said threaded portion being engageable with the threaded portion of said second threaded member, whereby said second threaded member is held at said predetermined position on said first die.

5. A process as defined in claim 4, wherein said first threaded member is a lens holding frame which holds a movable lens in a camera lens barrel.

6. The process as defined in claim 4 wherein said first threaded member comprises a lens moving operating member.

7. An injection mold for making a first tubular threaded member for use in threaded engagement with a threaded second tubular member, comprising: a threaded first die member having a shoulder abutting an end of said second threaded tubular member threadedly assembled therewith and a second die member in cooperating assembly with said threaded first die member and said threaded second tubular member to define a mold cavity between said first die member, said second die member and said tubular member, threads of said second tubular member defining a portion of said mold cavity.

8. The apparatus of claim 7, said attaching portion comprising a threaded portion integrally formed on said first die, and wherein a second threaded portion is integrally formed on said second threaded member and is continued from said first threaded portion of said second threaded member, whereby said second threaded member is held at said predetermined position on said first die.

9. The apparatus of claim 8 wherein one of said first and second dies is formed with a sprue for allowing the injection of a thermoplastic material into said molding cavity.

10. The apparatus of claim 8 wherein said first and second dies are formed with grooves which, upon assembly, form a runner leading to said molding cavity for introducing thermoplastic material therein.

* * * * *